United States Patent
Oh et al.

(10) Patent No.: US 9,358,915 B2
(45) Date of Patent: Jun. 7, 2016

(54) STORAGE ASSEMBLY FOR VEHICLE

(71) Applicants: Hyundai Motor Company, Seoul (KR); KBAUTOTECH CO., LTD., Asan-si (KR)

(72) Inventors: Man Ju Oh, Yongin-si (KR); Jae Woong Kim, Hwaseong-si (KR); Jae Woo Park, Ansan-si (KR); Jae Hoon Kim, Cheonan-si (KR)

(73) Assignees: HYUNDAI MOTOR COMPANY, Seoul (KR); KBAUTOTECH CO., LTD., Asan-Si (KR)

( * ) Notice: Subject to any disclaimer, the term of this patent is extended or adjusted under 35 U.S.C. 154(b) by 323 days.

(21) Appl. No.: 14/020,266

(22) Filed: Sep. 6, 2013

(65) Prior Publication Data

US 2014/0352327 A1 Dec. 4, 2014

(30) Foreign Application Priority Data

Jun. 3, 2013 (KR) ........................ 10-2013-0063383

(51) Int. Cl.
*F25B 21/02* (2006.01)
*B60N 3/10* (2006.01)
*F25B 21/04* (2006.01)
*F25D 31/00* (2006.01)

(52) U.S. Cl.
CPC ............... *B60N 3/104* (2013.01); *F25B 21/04* (2013.01); *F25B 2321/025* (2013.01); *F25D 31/008* (2013.01)

(58) Field of Classification Search
CPC .......... F25B 21/02; F25B 21/04; F25D 11/00; F25D 2400/12; B60H 1/00371
USPC ............................... 62/3.2, 3.3, 3.6, 3.64, 244
See application file for complete search history.

(56) References Cited

U.S. PATENT DOCUMENTS

| 5,720,171 | A | 2/1998 | Osterhoff et al. |
| RE41,295 | E | 5/2010 | Cauchy |
| 2006/0283577 | A1* | 12/2006 | Liu ...................... F28D 15/043 165/104.26 |
| 2009/0038317 | A1* | 2/2009 | Otey ...................... F25B 21/04 62/3.2 |

FOREIGN PATENT DOCUMENTS

| KR | 10-0356964 B1 | 10/2002 |
| KR | 10-0845153 B1 | 7/2008 |
| KR | 10-2012-0066212 A | 6/2012 |
| KR | 10-2012-0138894 A | 12/2012 |
| KR | 10-2013-0017655 A | 2/2013 |

* cited by examiner

*Primary Examiner* — Melvin Jones
(74) *Attorney, Agent, or Firm* — Morgan, Lewis & Bockius LLP

(57) ABSTRACT

A storage assembly for a vehicle includes a housing having an outlet formed at a rear end thereof, a cooling and heating cup holder installed in the housing and having a thermoelectric element attached to a side end surface thereof, a convenience device disposed to be adjacent to a side of the thermoelectric element in the housing and including a storage tray or an electrical control switch, a heat exchange pin and a blower disposed at the outlet side of the rear end of the housing, and a heat pipe having one end connected to the thermoelectric element and the other end extended to turn aside or traverse the convenience device and connected to the heat exchange pin.

9 Claims, 5 Drawing Sheets

STORAGE ASSEMBLY FOR VEHICLE

CROSS-REFERENCE TO RELATED APPLICATION

The present application claims priority of Korean Patent Application Number 10-2013-0063383 filed Jun. 3, 2013, the entire contents of which application is incorporated herein for all purposes by this reference.

BACKGROUND OF INVENTION

1. Field of Invention

The present invention relates to a storage assembly for a vehicle capable of storing a cup therein by being mounted in a vehicle, or the like, and performing cooling and heating and including convenience devices such as a tray, a controller, or the like.

2. Description of Related Art

A vehicle, or the like, is provided with a cup holder. This cup holder generally has only a simple holding function. However, in some vehicles, a cup holder having a cooling and heating function has been introduced.

Meanwhile, this cup holder may be installed at an armrest or be provided at trays of all seats in order to increase salability. Since various switches and a storing space are formed in the armrest and the tray, a design of a structure capable of effectively cooling a thermoelectric element has been required.

In addition, when the cup holder is mounted on the armrest in order to improve general convenience, a rear surface of the cup holder is provided with a controller controlling cooling/heating of the cup holder and a storing space for controlling or storing an audio device and other convenience devices. Therefore, an internal structure of the armrest is significantly narrow and complicated, and each component for securing performance needs to be disposed in the internal structure of the armrest. The present invention relates to a structure of separately disposing a cup holder and a heat radiation pin in order to improve convenience and increase a degree of freedom in a design.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for vehicle storage in which a cup holder and a heat radiation pin are separately disposed in order to improve convenience and increase a degree of freedom in a design.

Various aspects of the present invention provide for vehicle storage including: a housing having an outlet formed at a rear end thereof; a cooling and heating cup holder installed in the housing and having a thermoelectric element attached to a side end surface thereof; a convenience device disposed to be adjacent to a side of the thermoelectric element in the housing and including a storage tray or an electrical control switch; a heat exchange pin and a blower disposed at the outlet side of the rear end of the housing; and a heat pipe having one end connected to the thermoelectric element and the other end extended to turn aside or traverse the convenience device and connected to the heat exchange pin.

The housing may be an armrest housing.

The housing may include an inlet formed at a front end thereof.

The blower may contact the outlet of the housing, have the heat exchange pin installed at a front end thereof, and suck internal air of the housing to discharge the sucked internal air through the outlet.

The other end of the heat pipe may be inserted into and embedded in the heat exchange pin.

The thermoelectric element may have first and second surfaces for heat absorption and heat generation, wherein the first surface is closely adhered to the cup holder and the second surface is closely adhered to one end of the heat pipe.

The numbers of cup holders and heat pipes may be plural, and the other ends of the respective heat pipes may be inserted into one heat exchange pin to share the heat exchange pin with each other.

The heat pipe may have one end connected to the thermoelectric element and the other end extended to turn aside the storage tray and connected to the heat exchange pin.

The heat pipe may have one end connected to the thermoelectric element and the other end extended to traverse a lower surface of the control switch and connected to the heat exchange pin.

The present methods and apparatuses have other features and advantages apparent from the accompanying drawings, incorporated herein, and below Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
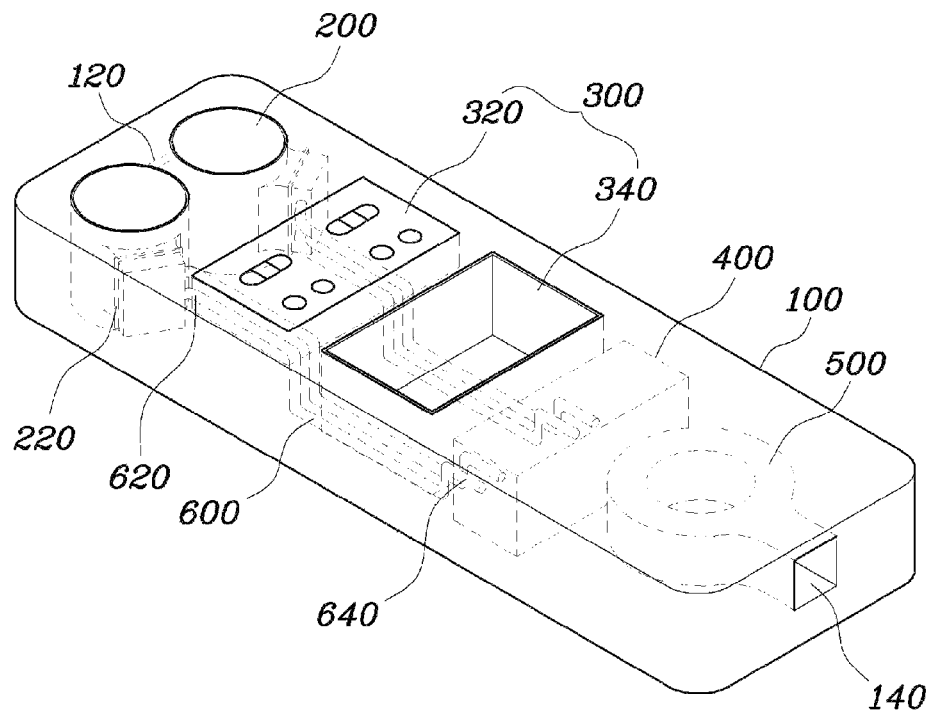
FIGS. 1 to 2 are views showing an exemplary storage assembly for a vehicle according to the present invention.
Figure 2:
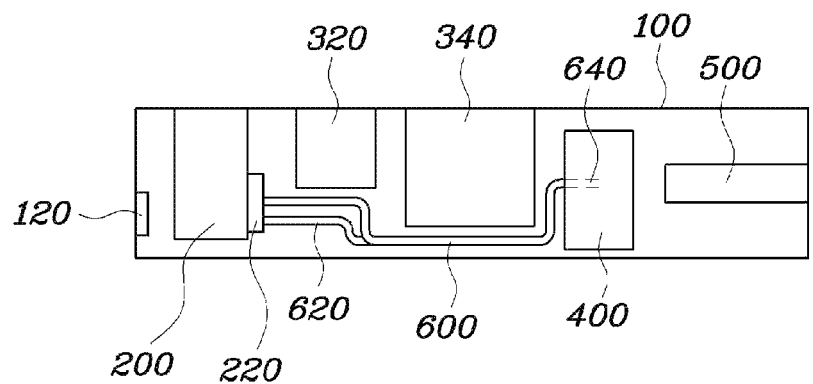
Figure 3:
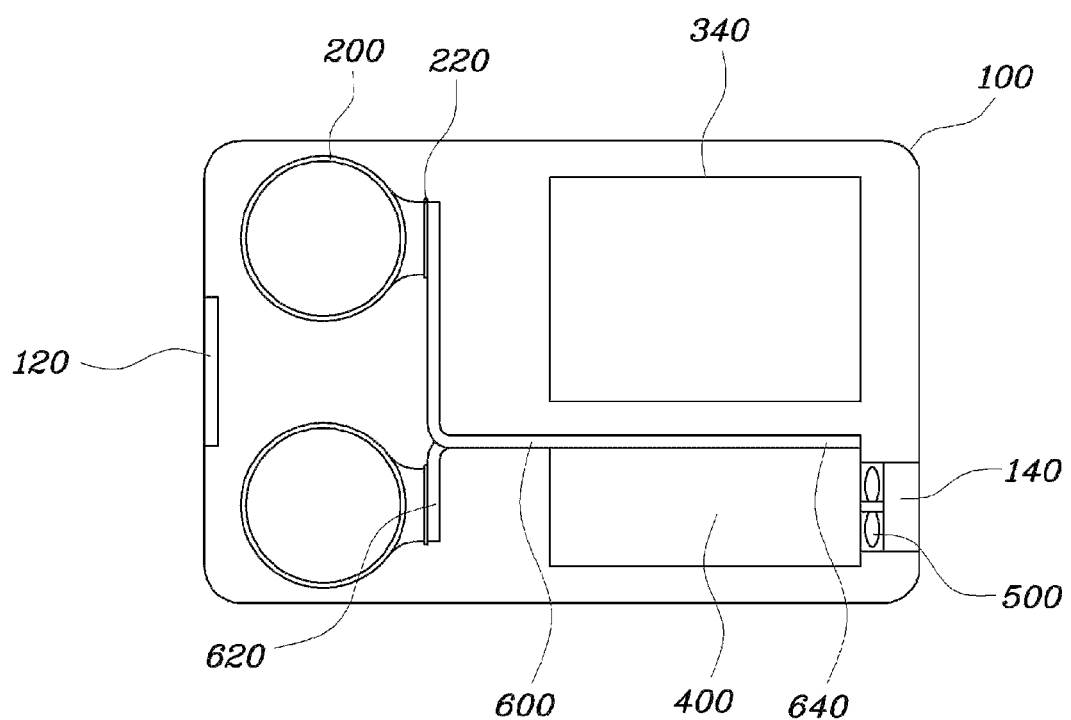
FIGS. 3, 4, 5 and 6 are views showing exemplary storage assemblies for a vehicle according to the present invention.
Figure 4:
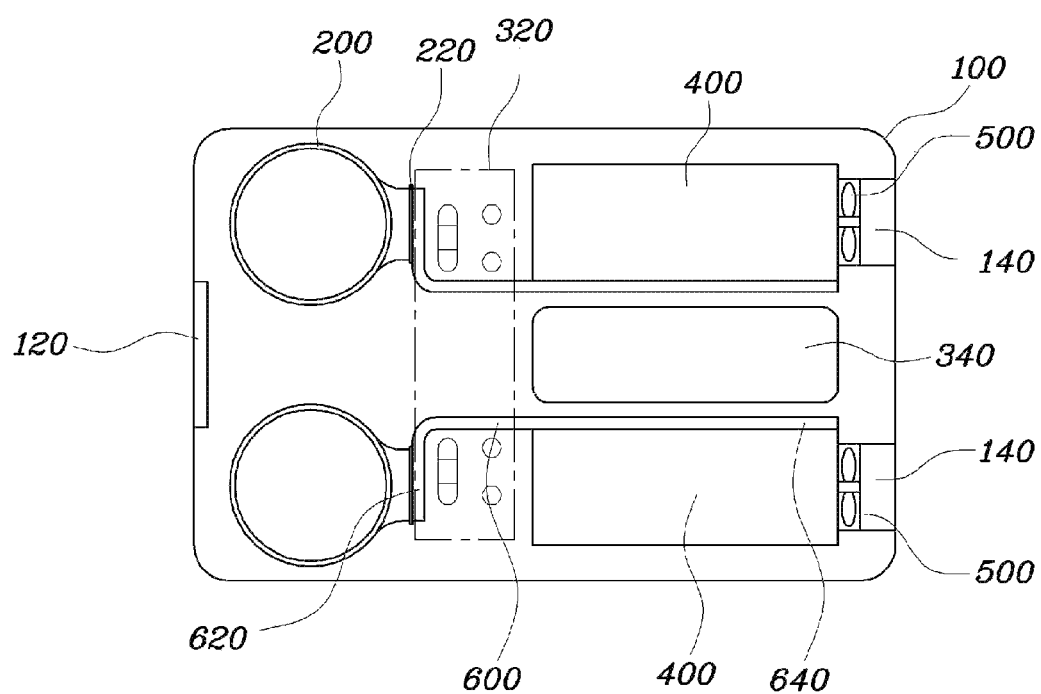
Figure 5:
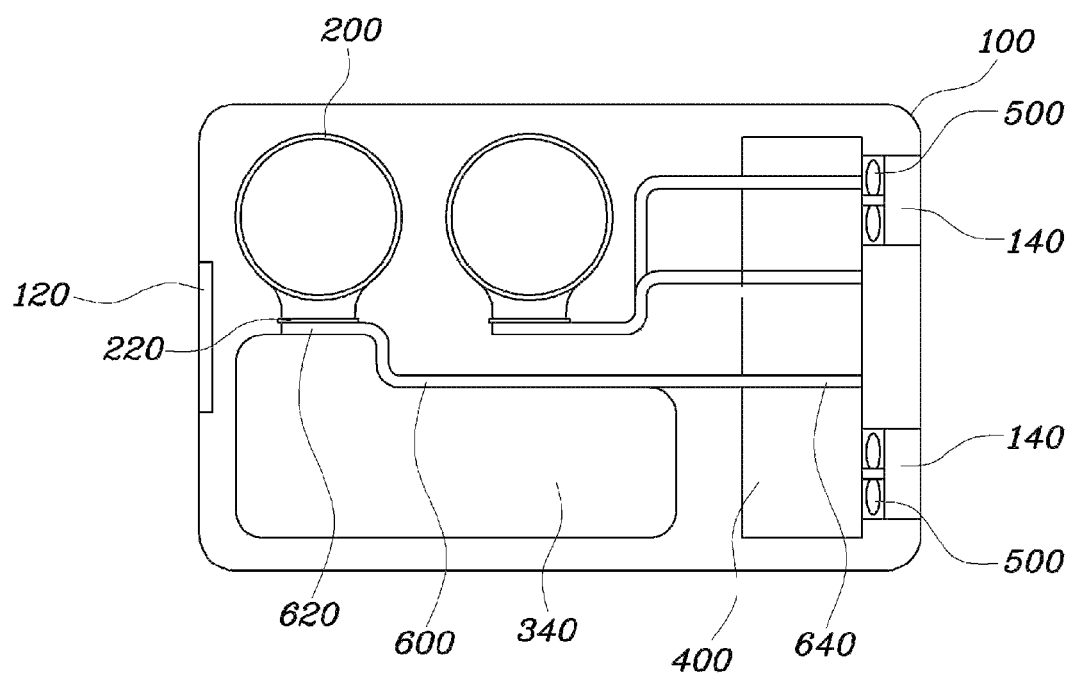
Figure 6:
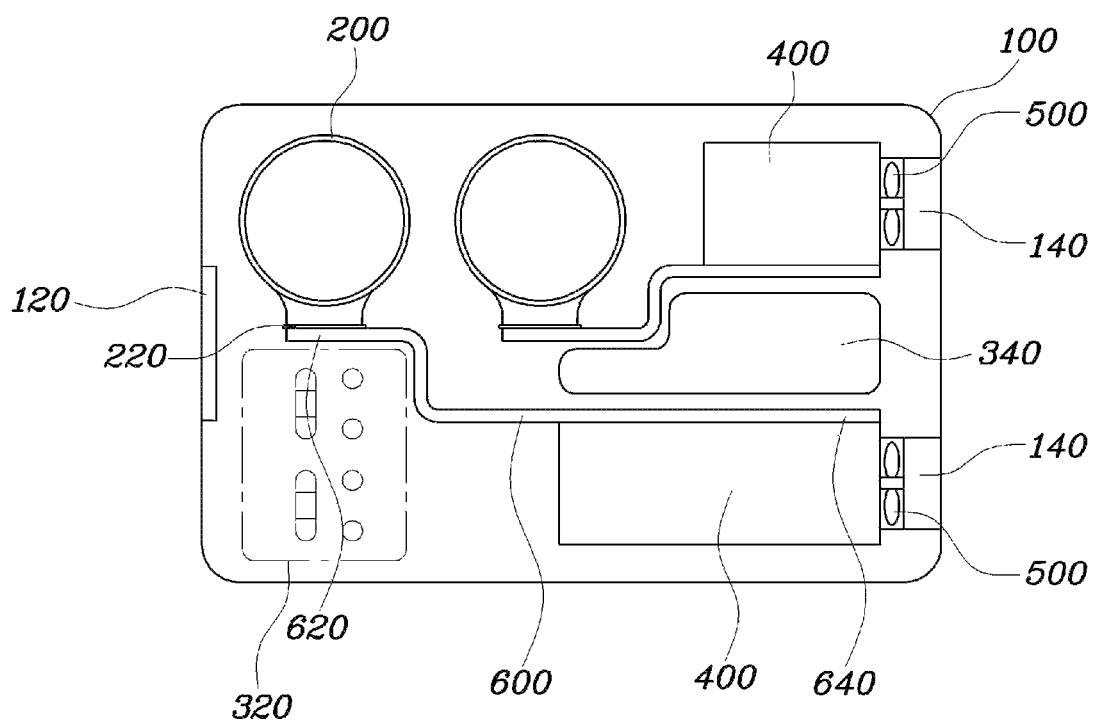

With reference to FIGS. 1 and 2, the storage assembly for a vehicle according to various embodiments of the present invention is configured to include a housing 100 having an outlet 140 formed at a rear end thereof, a cooling and heating cup holder 200 installed in the housing 100 and having a thermoelectric element 220 attached to a side end surface thereof; a convenience device 300 disposed to be adjacent to a side of the thermoelectric element 220 in the housing 100 and including a storage tray 340 or an electrical control switch 320; a heat exchange pin 400 and a blower 500 disposed at the outlet 140 side of the rear end of the housing 100; and a heat pipe 600 having one end 620 connected to the thermoelectric element 220 and the other end 640 extended to turn aside or traverse the convenience device 300 and connected to the heat exchange pin 400.

The housing 100 may be an armrest housing. The storage assembly for a vehicle according to various embodiments of the present invention basically includes the cup holder 200, has a structure in which the storage tray 340 or the control switch 320 is installed together with the cup holder, and is disposed at an armrest, a console between all seats, a shift lever side tray, or the like, provided in a vehicle according to the related art.

Meanwhile, since the armrest, the console, or the like, has a limited space, in the case in which all of the cup holder 200, the storage tray 340, and the control switch 320 are mounted in the storage assembly for a vehicle, efficiency of the thermoelectric element 200 may be decreased.

That is, the thermoelectric element 220 has first and second surfaces for heat absorption and heat generation, wherein the first surface is closely adhered to the cup holder 200 and the second surface radiates opposite heat. Particularly, at the time of implementing a cooling function, a structure of discharging the heat should be effectively designed in order to increase cooling efficiency and implement a substantial cooling function.

To this end, the housing 100 according to various embodiments of the present invention has a housing structure such as a basic armrest, or the like, has a structure in which an upper end thereof is partially opened, and includes the outlet 140 formed at the rear end thereof In addition, the cooling and heating cup holder 200 is installed in the housing 100. In various embodiments of the present invention, the cooling and heating cup holder 200 is installed at a front end portion or a side end portion of the housing 100. Further, the cup holder 200 has the thermoelectric element 220 attached to the side end surface thereof. The cup holder 200 is closely adhered to the thermoelectric element 200 to cool or heat a cup through conduction or convection.

Further, the housing 100 is provided with the convenience device 300 adjacent to the side of the thermoelectric element 220, wherein the convenience device 300 includes the storage tray 340 or the electrical control switch 320 (which is a controller for the thermoelectric device, the blower, sheet sliding, or the like).

In addition, the housing 100 includes the heat exchange pin 400 and the blower 500 disposed at the outlet 140 side of the rear end thereof. Further, the thermoelectric element 220 and the heat exchange pin 400 are connected to each other through the heat pipe 600 for heat radiation of the thermoelectric element 220. The heat pipe 600 has one end connected to the thermoelectric element 220 and the other end extended to turn aside or traverse the convenience device 300 and connected to the heat exchange pin 400, such that it is advantageous for heat radiation while effectively configuring a space of the housing 100. The case in which the heat pipe 600 advances while traversing a lower end of the convenience device 300 is shown in FIGS. 1 and 2.

The heat pipe 600 is to transfer or dissipate heat from one side thereof to the other side thereof at a speed close to a supersonic speed. Therefore, in the case in which the cup holder 200 is disposed at the front or the side, the heat pipe 600 connects the cup holder 200 to the heat exchange pin 400 in order to install the convenience device 300 while performing the heat radiation.

Meanwhile, the housing 100 includes an inlet 120 formed at a front end thereof. Through the above-mentioned structure, in the case in which the cooling and heating function of the cup holder 200, the blower 500 is driven, and external air (vehicle internal air) is sucked into the housing 100 through the inlet 120 and gaps between the housing and components, passes through the heat exchange pin 400, and is then discharged to the outlet 140. Meanwhile, the inlet 120 and the outlet 140 form a linear channel to effectively perform heat radiation and discharge the air to the rear end of the housing 100 and then discharge the air to a trunk, or the like, thereby making it possible to make the interior of the vehicle pleasant and prevent hot wind from being transferred to a passenger.

The blower 500 contacts the outlet 140 of the housing 100, has the heat exchange pin 400 installed at a front end thereof, and sucks internal air of the housing to discharge the sucked internal air through the outlet 140.

In addition, the other end 640 of the heat pipe 600 may be inserted into and embedded in the heat exchange pin 400. The other end 640 of the heat pipe 600 penetrates into and is embedded in the heat exchange pin 400 having a rectangular box shape, thereby making it possible to effectively dissipate the heat over the entire heat exchange pin 400.

Meanwhile, the thermoelectric element 220 has the first and second surfaces for heat absorption and heat generation, wherein the first surface may be closely adhered to the cup holder 200 and the second surface may be closely adhered to one end of the heat pipe 600. In addition, the numbers of cup holders 200 and heat pipes 600 may be plural, and the other ends 640 of the respective heat pipes 600 may be inserted into one heat exchange pin 400 to share the heat exchange pin 400 with each other.

FIGS. 3 to 6 are views showing storage assemblies for a vehicle according to various exemplary embodiments of the present invention. In the case in which the storage tray 340 is provided as a convenience device as in various embodiments of the present invention shown in FIGS. 3 to 6, the heat pipe 600 may have one end 620 connected to the thermoelectric element 220 and the other end 640 extended to turn aside the storage tray 340 and connected to the heat exchange pin 400. Therefore, an area and a depth of the storage tray 340 may be increased.

In addition, in the case in which the control switch 320 is installed, the heat pipe 600 may have one end 620 connected to the thermoelectric element 220 and the other end 640 extended to traverse a lower surface of the control switch 320 and connected to the heat exchange pin 400. Therefore, the number of bends in the heat pipe 600 is decreased as much as possible, thereby making it possible to increase durability and decrease a cost.

With the storage assembly for a vehicle having the structure as described above, the cup holder capable of performing the cooling and heating may be mounted at a rear seat armrest in consideration of a rear seat passenger and be mounted in a rotating armrest when a passenger gets in the center of the vehicle.

In addition, the controller, the tray, and the like, may be freely disposed in the armrest, and a suction amount of air for heat radiation of the thermoelectric element may be increased to improve cooling and heating performance of the cup holder.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A storage assembly for a vehicle comprising:
   a housing having an outlet formed at an outer surface of the housing at a rear end of the housing;
   a cooling and heating cup holder installed in the housing and having a thermoelectric element attached to a side end surface thereof;
   a convenience device disposed adjacent to a side of the thermoelectric element in the housing and including a storage tray or an electrical control switch;
   a heat exchange pin disposed at an outlet side of the rear end of the housing and a blower connected to the outlet at the outlet side of the rear end of the housing; and
   a heat pipe having one end connected to the thermoelectric element and an opposing end extended to turn aside or traverse the convenience device and connected to the heat exchange pin.

2. The storage assembly for a vehicle of claim 1, wherein the housing is an armrest housing.

3. The storage assembly for a vehicle of claim 1, wherein the housing includes an inlet formed at a front end thereof.

4. The storage assembly for a vehicle of claim 1, wherein the blower contacts the outlet of the housing, has the heat exchange pin installed at a front end thereof, and sucks internal air of the housing to discharge the sucked internal air through the outlet.

5. The storage assembly for a vehicle of claim 1, wherein the opposing end of the heat pipe is inserted into and embedded in the heat exchange pin.

6. The storage assembly for a vehicle of claim 1, wherein the thermoelectric element has first and second surfaces for heat absorption and heat generation, the first surface being closely adhered to the cup holder and the second surface being closely adhered to the one end of the heat pipe.

7. The storage assembly for a vehicle of claim 1, comprising a plurality of cup holders and a plurality of heat pipes, and opposing ends of the respective heat pipes are inserted into one heat exchange pin to share the heat exchange pin.

8. The storage assembly for a vehicle of claim 1, wherein the heat pipe has one end connected to the thermoelectric element and an opposing end extended to turn aside the storage tray and connected to the heat exchange pin.

9. The storage assembly for a vehicle of claim 1, wherein the heat pipe has one end connected to the thermoelectric element and an opposing end extended to traverse a lower surface of the control switch and connected to the heat exchange pin.

* * * * *